United States Patent [19]

Shigematsu et al.

[11] Patent Number: 5,530,329
[45] Date of Patent: Jun. 25, 1996

[54] DRIVE CONTROL DEVICE FOR OPENING/CLOSING MEMBER

[75] Inventors: Kouichi Shigematsu; Osamu Kawanobe, both of Yokohama, Japan

[73] Assignee: Ohi Seisakusho Co., Ltd., Yokohama, Japan

[21] Appl. No.: 411,881

[22] Filed: Mar. 28, 1995

[30] Foreign Application Priority Data

Mar. 31, 1994 [JP] Japan .................................. 6-063499

[51] Int. Cl.$^6$ ........................................ H02P 3/00
[52] U.S. Cl. .............................. 318/469; 318/476
[58] Field of Search ........................ 318/256, 257, 318/264, 265, 266, 268, 272, 273, 275, 280, 283, 286, 452, 453, 454, 456, 457, 458, 459, 461–469, 474–479; 49/26–28

[56] References Cited

U.S. PATENT DOCUMENTS

| | | | |
|---|---|---|---|
| 4,511,832 | 4/1985 | Schmitz | 318/685 |
| 5,162,711 | 11/1992 | Heckler | 318/264 |
| 5,278,480 | 1/1994 | Murray | 318/286 X |
| 5,334,876 | 8/1994 | Washeleski et al. | 318/469 X |
| 5,396,158 | 3/1995 | Long et al. | 318/282 |
| 5,404,673 | 4/1995 | Takeda et al. | 49/28 |
| 5,422,551 | 6/1995 | Takeda et al. | 318/265 |

FOREIGN PATENT DOCUMENTS

| | | |
|---|---|---|
| 4127047 | 2/1993 | Germany . |
| 4316898 | 12/1993 | Germany . |
| 4321264 | 1/1994 | Germany . |
| 2268287 | 1/1994 | United Kingdom . |

*Primary Examiner*—Brian Sircus
*Attorney, Agent, or Firm*—Foley & Lardner

[57] ABSTRACT

A drive control device for an opening and closing member is active to optimally adjust a threshold level for pinch detection. Utilizing a speed sensor or the like, the closing speed of the opening/closing member is detected. The value of the closing speed is renewed in accordance with the closing position and stored in memory. Based on memorized data, a predicting circuit derives a future closing speed. To the predicted value there is added an allowed addition value, to permit a threshold level setting circuit to set an appropriate threshold for pinch detection. The allowed addition value is adjusted in accordance with the closing speed of the opening/closing member by a threshold level adjusting circuit.

10 Claims, 9 Drawing Sheets

DRIVE CONTROL DEVICE FOR OPENING/CLOSING MEMBER

BACKGROUND OF THE INVENTION

1. Field of The Invention

The present invention relates to a drive control device for an opening and closing member, and more particularly, to such a drive control device which is equipped with a safety mechanism by which undesirable pinching of a foreign object, by the opening and closing member under closing movement thereof, can be prevented.

2. Description of The Related Art

As one of drive control devices of the abovementioned type, there is known a control device which controls a driving mechanism which, for opening and closing a window (viz., opening and closing member) of a motor vehicle, raises and lowers the window by the force of an electric motor. That is, when the motor is energized to run in one direction, the window is raised, while, when the motor is energized to run in the other direction, the window is lowered.

In conventional control devices, there is a type wherein while a window up switch is kept ON, the motor continues to run in one direction to close the window, and when the window up switch is turned OFF, the motor stops running. In these control devices, there is also a type which has means for monitoring whether, during upward movement of a window, a part of a passenger's body is accidentally pinched by the window or not. That is, if such pinch is detected, the motor is instantly switched OFF to stop upward movement of the window for increased safety. In such control devices, there is employed a system which monitors change in a closing resistance value (for example, driving current of the electric motor) which varies based on increase in resistance to rising movement of the window, and which, when the closing resistance value (which will be referred to as a watch value hereinafter) exceeds a predetermined threshold level, is active to stop rotation of the motor in the closing direction, judging that pinching has occurred due to the presence of an object blocking the path of closing movement of the opening/closing member.

In addition to the above-mentioned type of drive control device, there is another so-called 'learning control' type in which a closing resistance of the window varies in accordance with the closing position thereof. The threshold level for pinch detection is set by memorizing the monitor value repeatedly and renewing the threshold level each time the window changes its closing position. For example, in case wherein pinch detection is intended by monitoring a change of the driving current of the electric motor, the monitor value detected under normal operation of the window is memorized for each closing position of the window and a predetermined allowed variation value is added to the memorized monitor value to make a threshold level for pinch detection for each closing position. When, thereafter, the window is moved in a closing direction, the detected monitor value for each closing position is compared with the threshold level to determine whether pinching has occurred. The value for deriving the threshold level is constantly renewed unless occurrence of pinching is detected.

However, in such a 'learning control' drive control device, it is difficult to allow the threshold level for pinch detection to have a predetermined value which can be commonly used throughout full range of the closing movement of the window. That is, considering the closing resistance varies depending on the closing position of the window it is necessary to add a variation allowance to the threshold level. However, according to this necessity, the sensitivity of pinch detection must be lowered by a degree corresponding to the allowance.

In the latter drive control device, the threshold level for pinch detection is set in accordance with the closing position of the window. However, because in setting the threshold level the allowance added to the memorized monitor value is constant, a drawback is present in such types of drive control device. That is, the degree of allowance is varied in accordance with the degree of the memorized monitor value over the entire threshold. For example, in case wherein the closing load of the window is small and thus the monitor value is small, the degree of allowance is effectively larger and thus the sensitivity of pinch detection is lowered. While, in a case wherein the closing load is large and thus the monitor value is large, the degree of allowance is effectively smaller and thus erroneous determination of occurrence of pinching may take place.

An object of the present invention is to provide a drive control device for an opening and closing member, which can always accurately detect pinching by controlling the threshold level for pinch detection to an optimum degree of sensitivity.

SUMMARY OF THE INVENTION

It is therefore a principal object of the present invention to overcome the drawbacks of the related art.

It is a further object of the present invention to provide a drive control device of for an opening and closing member which can accurately detect occurrence of pinching by controlling a threshold level for pinch detection to an optimum degree.

In order to accomplish the aforementioned and other objects, a drive control device for an opening/closing member is provided, comprising:

DESCRIPTION OF THE PREFERRED EMBODIMENT

Referring to the accompanying drawings, a preferred embodiment of the invention will be described hereinbelow in detail.

FIGS. 1 to 5 are drawings of a first embodiment wherein the invention is applied to a drive control device which raises and lowers a window (viz., opening and closing member) of an automotive side door to close and open the same. That is, the invention is applied to an automotive power window system.

Figure 1:
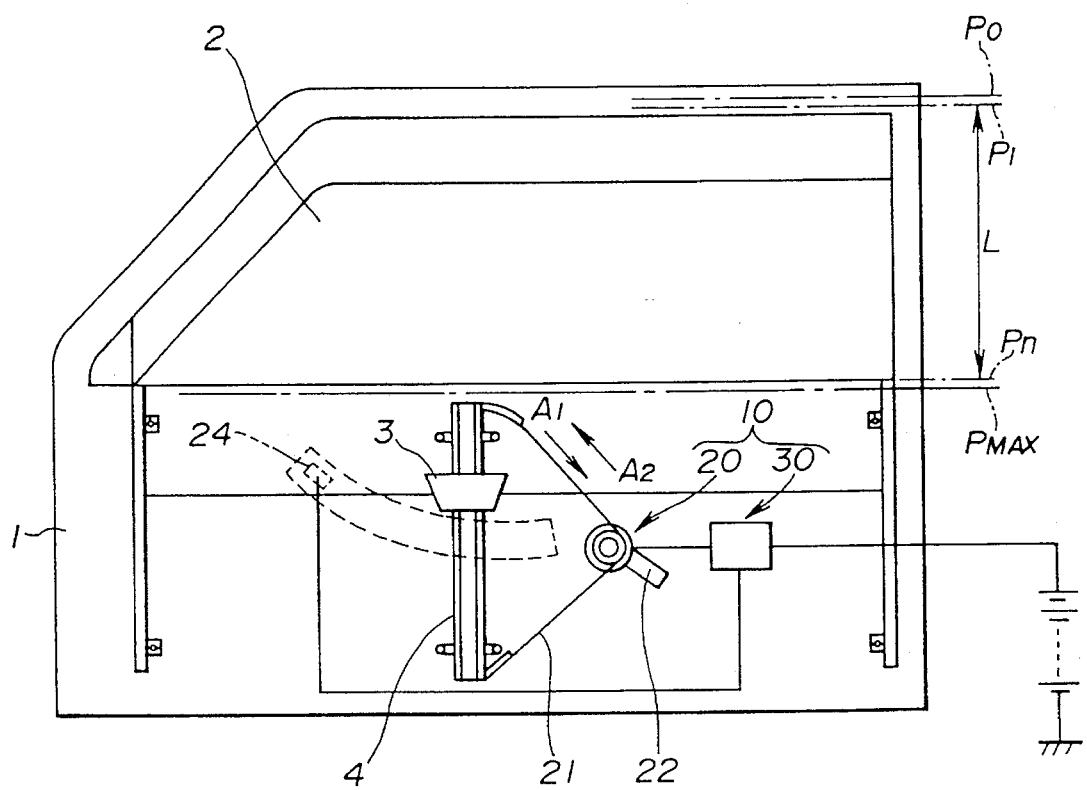
FIG. 1 is a schematically illustrated side view of an automotive door equipped with a power window arrangement including a drive control device according to a first embodiment of the present invention.

FIG. 1 is a schematically illustrated side view of an automotive side door i which is equipped with a drive control device 10. The drive control device 10 comprises a driving mechanism 20 which raises and lowers a carrier 3, which is fixed to a window 2, along a guide rail 4. In the driving mechanism 20, when a wire 21 is moved in the direction of the arrow A1 or A2 due to rotation of an electric motor (driving power source) 22 in first or second (i.e. normal or reverse) directions, the window 2 is raised or lowered together with the carrier 3. The electric motor 22 is equipped with a speed sensor 23 (see FIG. 2) which outputs a pulse signal in accordance with the rotation speed of the motor. Inside the side door 1, there is arranged a switch device 24. The electric motor 22, the speed sensor 23 and the switch device 24 are electrically connected to a control device 30.

Figure 2:
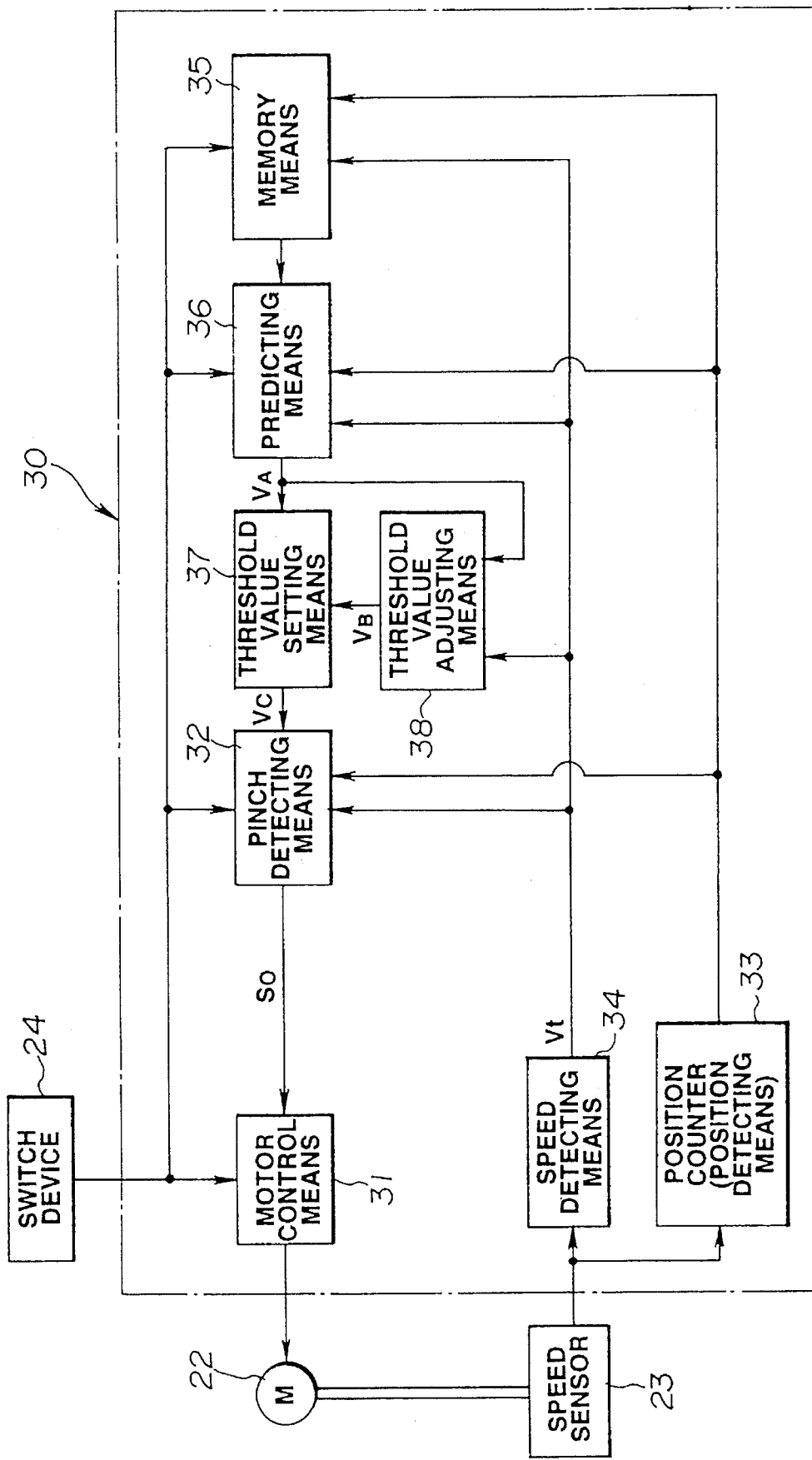
FIG. 2 is a block diagram of the control device of FIG. 1.

As seen in FIG. 2, a motor control means 31 is provided which controls operation of the motor 22 in accordance with operating condition of the switch device 24 and control signals issued from a pinch detecting means 32, which will be explained in detail hereinlater. The switch device 24 comprises an UP-switch which issues an UP-signal when controlled ON for raising the window 2 and a DOWN-switch which issues a DOWN-signal when controlled ON for lowering the window 2. When the UP-signal is issued, the control means 31 turns an UP-relay (not shown) ON to cause the motor 22 to turn in one direction, while, when the DOWN-signal is issued, the control means turns an DOWN-relay ON to cause the motor 22 to turn in the other (i.e. reverse) direction.

A position counter (viz., position detecting means) 33 is provided which is active to detect a vertical position P of the window 2 by counting pulses of the pulse signal issued from the speed sensor 23. The position counter 33 counts a value 0 (zero) when the window 2 occupies its uppermost position Po (see FIG. 1), and counts the motor pulses of the pulse signal from the speed sensor 23 upwardly in value according to lowering of the window 2, and counts down the signal to a lower value in accordance with rising of the window 2. Accordingly, when the window 2 is in its lowermost position PMAX (see FIG. 1), the position counter indicates the maximum count value.

A speed detecting means 34 (viz., closing position detecting means) detects the closing speed (viz., rising speed) of the window 2 by calculating the period of the pulse signal output from the speed sensor 23.

As seen in FIG. 2, memory means 35, predicting means 38, threshold level setting means 37 and a threshold level adjusting means 38 are also provided. The functions of these components will be described hereinafter together with their operations. In accordance with a threshold level which has been set by the threshold setting means 37 based on both the rising speed (closing) of the window 2 detected by the speed detecting means 34 and the value counted by the counter 33, the pinch detecting means 32 carries out determination as to whether or not a foreign object is pinched by the window 2 while rising within a pinch monitoring zone L (see FIG. 1) which will be described hereinafter. For this function, the control means 30 is equipped with a detecting portion (not shown) for the pinch monitoring zone L. That is, based on the value counted by the position counter 33, the detecting portion carries out a determination as to whether or not the window 2 is positioned within the pinch monitoring zone L ranging from a position P1 at a given distance from the limited position P0 and a position Pn at a given distance from the other limited position PMAX. The pinch monitoring zone L corresponds to window positioning within which pinching tends to occur. The control means further includes has a timer T1 (not shown) which starts when the UP-switch of the switch device 24 is turned ON and counts while the ON condition of the UP-switch continues or until the elapse of a stabilizing time period t1. The stabilizing time period t1 is the period elapsed from the time when the window 2 starts its rising movement to the time when the rising speed becomes stable. As will be described hereinafter, during this stabilizing time period t1, pinch detection may not be carried out. Thus, the stable time t1 will be referred to as "mask time t1" in the following description of drive control operation according to the invention.

Figure 3:
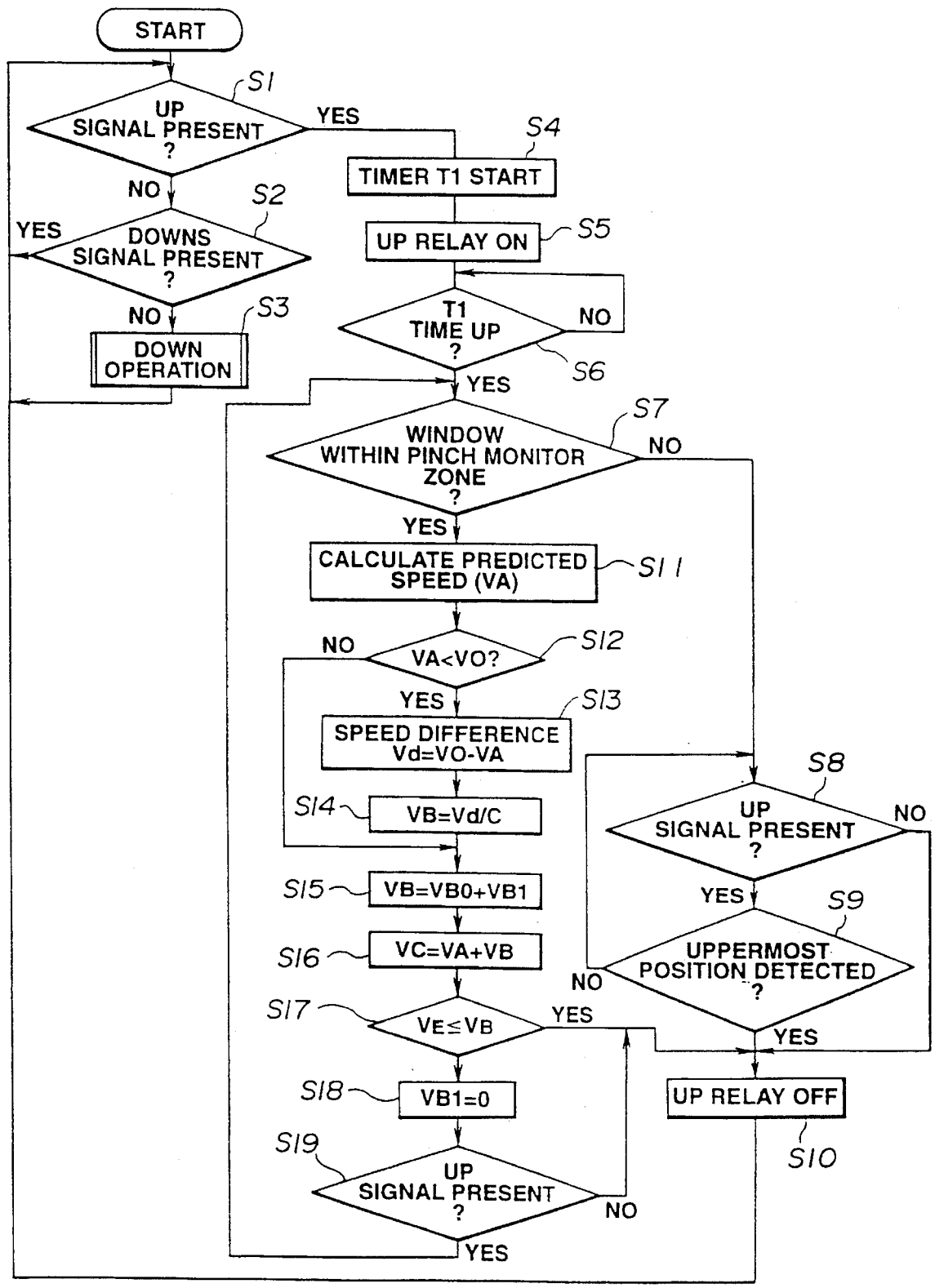
FIG. 3 is a flowchart depicting operation steps carried out by the control device shown of FIG. 1.

Hereinbelow, actual operation of the invention will be described with reference to FIG. 3.

When, due to an ON condition of the DOWN-switch of the switch device 24, the DOWN-signal is issued, the operation goes to step S3 via steps S1 and S2, so that the motor control means 31 activates the motor 22 to turn in the reverse direction and thus the window 2 is moved downward (DOWN-operation). On the other hand, when UP-operation is initiated by operation of the UP-switch of the switch device 24, the UP-signal is issued at step S1, starting the timer T1 at step S4 and the UP-relay (not shown) is turned ON to start UP-operation (i.e. upward movement) of the window 2 in step S5. Then, the elapsed time of the timer T1 is checked at step S6.

If, during operation steps S6 and S7, the time period counted by the the timer T1 is elapsed and the window 2 is not positioned within the pinch monitoring zone L, the UP-relay is turned OFF and rising movement of the window is stopped at step S10. In this case, window UP-operation is terminated subject to detection in step S9 of the window 2 having reached it's uppermost position P0 at which time issuance of the UP-signal is terminated. Determination as to whether the output of the UP-signal has been discontinued is carried out at step S8.

However, if the window 2 remains within the pinch monitoring zone L after elapse of the period of the timer T1, steps S7 to S19, including pinch detecting operation steps S11 to S18, are cyclically repeated as long as the window 2 is positioned within the pinch monitoring zone L as determined in step S7, and continuation of the UP-signal output is detected at step S19.

The operational steps specifically taken at steps S11–S18 to effect pinch detection operation will be explained hereinbelow. According to the present embodiment, window speed data is stored in the memory means 35 such that a rate of variation of the window closing speed may be calculated by the predicting means 36 for determining a predicted window closing speed VA based on the window speed data in memory.

That is, the memory means 35 is partitioned to store a rate of variation of the window closing speed which varies in accordance with the value counted by the position counter 33. For example, in a first memory area (partition) of the memory means 35 there is stored a change rate Vn-1/Vn between the closing speed Vn at a position Pn and the closing speed Vn-1 at a position Pn-1, and in a second memory area, there is stored a change rate Vn-2/Vn-1 between the closing speed Vn-1 at a position Pn-1 and the closing rate Vn-2 at a position Pn-2. Like this, various change rates of the closing speed of the window positioned within the pinch monitoring zone L are respectively stored. Thus, the stored value of the change rate of window closing speed is continuously updated. The initial value of the change rate is a predetermined value set so as to permit the window 2 to move smoothly from the lowermost position PMAX to the uppermost position P0 at a speed determined as a reasonable operating speed for such a power window system.

Based on the continuously updated memory data in the memory means 35, the predicting means 36 calculates the predicted speed VA in the following manner. That is, for example, in case wherein the window 2 moves in the closing direction from a position P3 to another position P2, a change rate V2/V3 between the previous closing speed V3 at the position P3 and the previous closing speed V2 at the position P2 is read from the memory means 37, and based on both the change rate V2/V3 and a current closing speed V3(t) detected at the position P3, a predicting portion 32A predicts a current closing speed V2' at the position P2 (V2'=(V2/V3)×V3(t)). Like this, the predicting means 36 calculates a predicted speed VA at each closing position of the window 2 one after another at step S11.

Thereafter, the predicting means 37 and the threshold level setting means 38 derive a threshold level (hereinbelow: "comparison speed VC") which is used for pinch detection in steps S12 to S16.

That is, first, the threshold level setting means 38 compares the predicted speed VA and a reference speed V0 at step S12. When the predicted speed VA is smaller than the reference speed VO (viz., VA<V0), the speed difference Vd (Vd=V0–VA) is derived at step S13 and the speed difference Vd is divided by a predetermined modulus C to derive a so-called allowable speed addition value VB1 (VB1=Vd/C) at step S14. Then, to the allowable speed addition value VB1, there is added a minimum allowable speed VB0 to derive a so-called allowed speed VB (VB=VB0+VB1) (step S15). The values of the minimum allowable speed VBO, the allowable speed addition value VB1 and the allowed speed VB are negative. Thus, as will be described hereinafter, when the predicted speed VA and the allowed speed VB are added to derive the comparison speed VC, the comparison speed VC indicates a value which is smaller than that of the predicted speed VA by that of the allowed speed VB.

Figure 4:
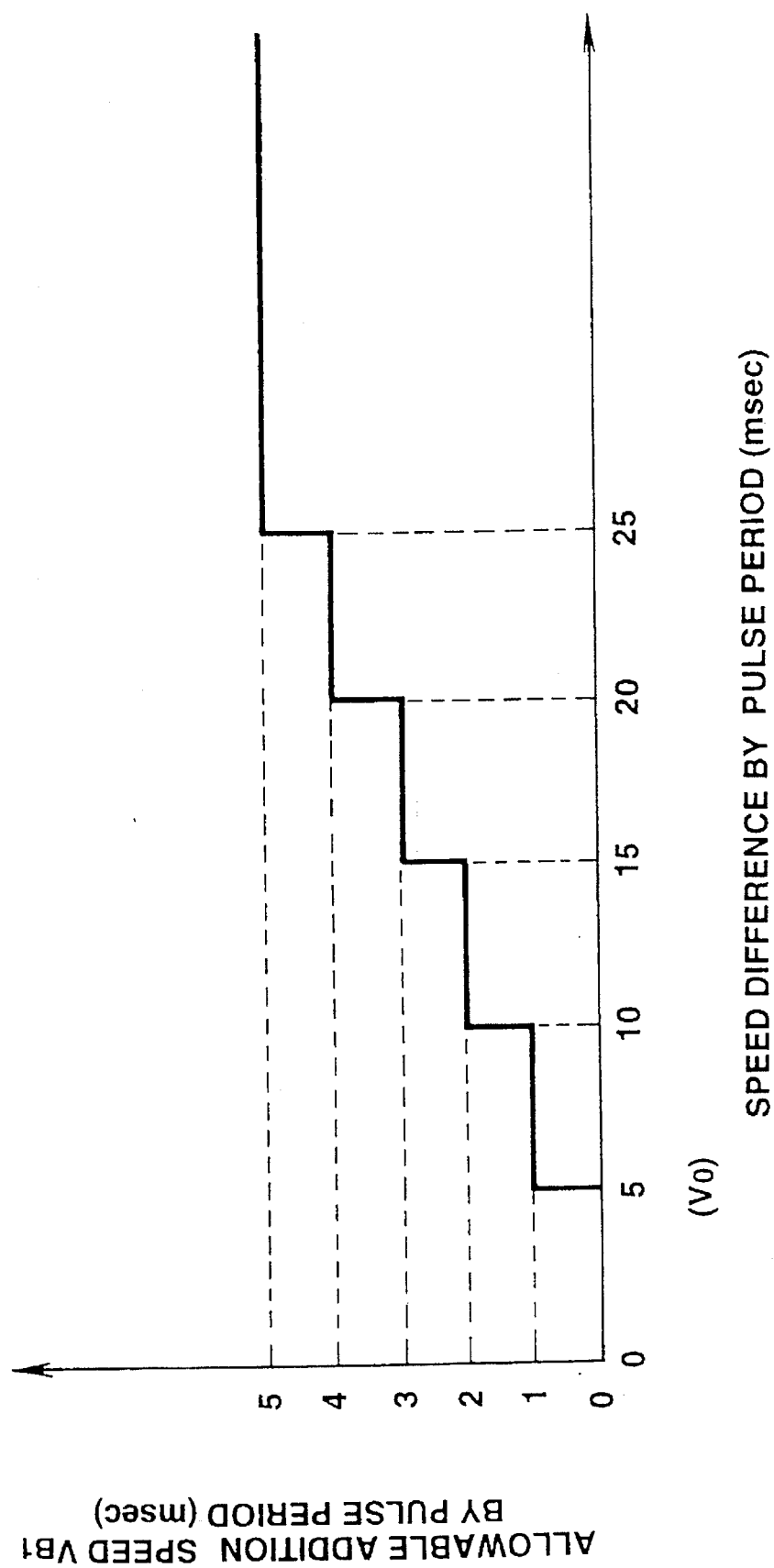
FIG. 4 is a graph for explaining a threshold level adjusting operation carried out by the control device of FIG. 1.

In the disclosed embodiment, the predicted speed VA, the reference speed VO, the speed difference Vd and the minimum allowable speed VBO are represented in terms of the period of the pulse signal (hereinbelow: pulse period) output from the speed sensor 23 (see FIG. 2). That is, the reference speed VO is 5 msec in terms of pulse period conversion, the modulus C is 5 (five), the minimum allowable speed VBO is 1 msec in terms of pulse period conversion, and the allowable speed addition value VB1 is also represented in terms of the pulse period and shows an integer. Accordingly, the speeds VB0 and VB1 and the allowed speed VB which is sum of the speeds VB0 and VB1 are all positive. When, for example, the speed difference Vd is within a range from 5 msec. to 10 msec. (that is, 5 msec<Vd<10 msec), the allowable speed addition value VB1 becomes 1 msec as shown in FIG. 4. The allowable speed addition value VB1 is added to the minimum allowable speed VB0 (1 msec), so that the allowed speed VB becomes 2 msec. Like this, when the speed difference Vd is within a range from 10 msec to 15 msec (that is, 10 msec. Vd<15 msec), the allowable speed addition value VB1 becomes 2 msec, and the allowed speed VB becomes 3 msec. Like this, each time the speed difference Vd is increased by 5 msec, the allowed speed VB is increased from the minimum allowable speed by 1 msec.

Thereafter, by adding the predicted speed VA and the allowed speed VB, the threshold level setting means 37 derives the comparison speed VC (that is, VC=VA+VB) at step S16. If desired, these speeds VA, VB and VC may be represented in terms of pulse period conversion together with a current speed Vt which will be explained in detail hereinbelow.

Thereafter, the pinch detecting means 32 compares the comparison speed VC and the current closing speed (hereinbelow: "current speed") of the window 2 at step S17. When the current speed Vt becomes greater than the comparisons speed VC, a detection signal SO is issued indicative of occurrence of pinching. Upon issuance of the detection signal S0, the motor control means 31 turns the UP-relay OFF and thus stops the rising movement (UP-operation) of the window 2 (step S10).

Figure 5:
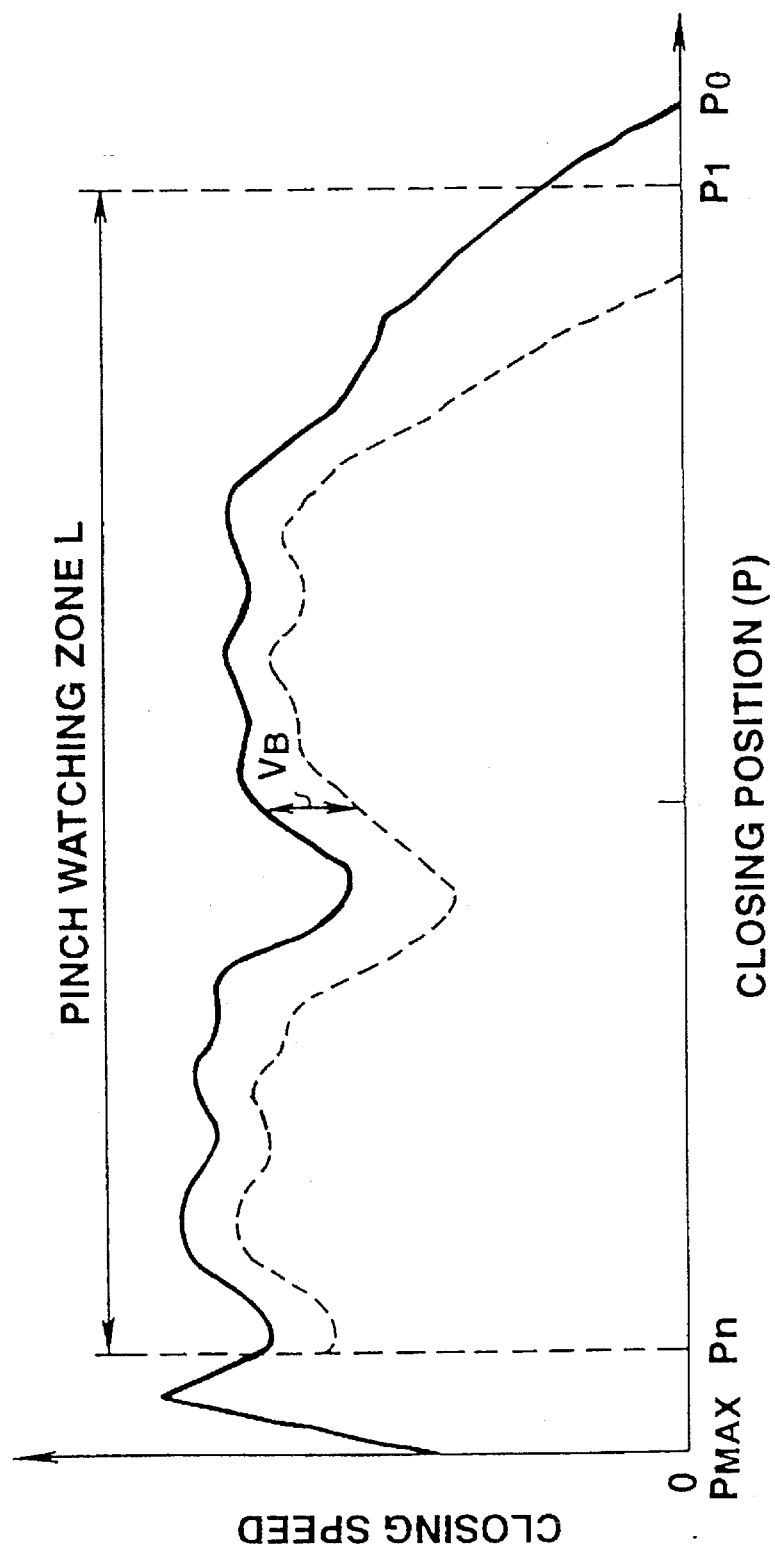
FIG. 5 is a graph showing the relationship between the closing position of the window of FIG. 1 and a closing speed thereof.

Accordingly, if the closing speed of the window 2 changes in a manner as shown by the solid line in FIG. 5, the allowed speed VB is adjusted in accordance with the magnitude of the closing speed, so that the comparison speed (threshold level) VC changes in a manner as shown by the dotted line in the same drawing. When the closing speed of the window 2 is low because the closing resistance of the same is great, the force which is produced when pinching occurs becomes small. Accordingly, in this case, as seen in FIG. 5, pinch detection is achieved with a smaller allowed speed VB than in a case wherein the closing speed is great. Thus, occurrences of false detection can be avoided.

Figure 6:
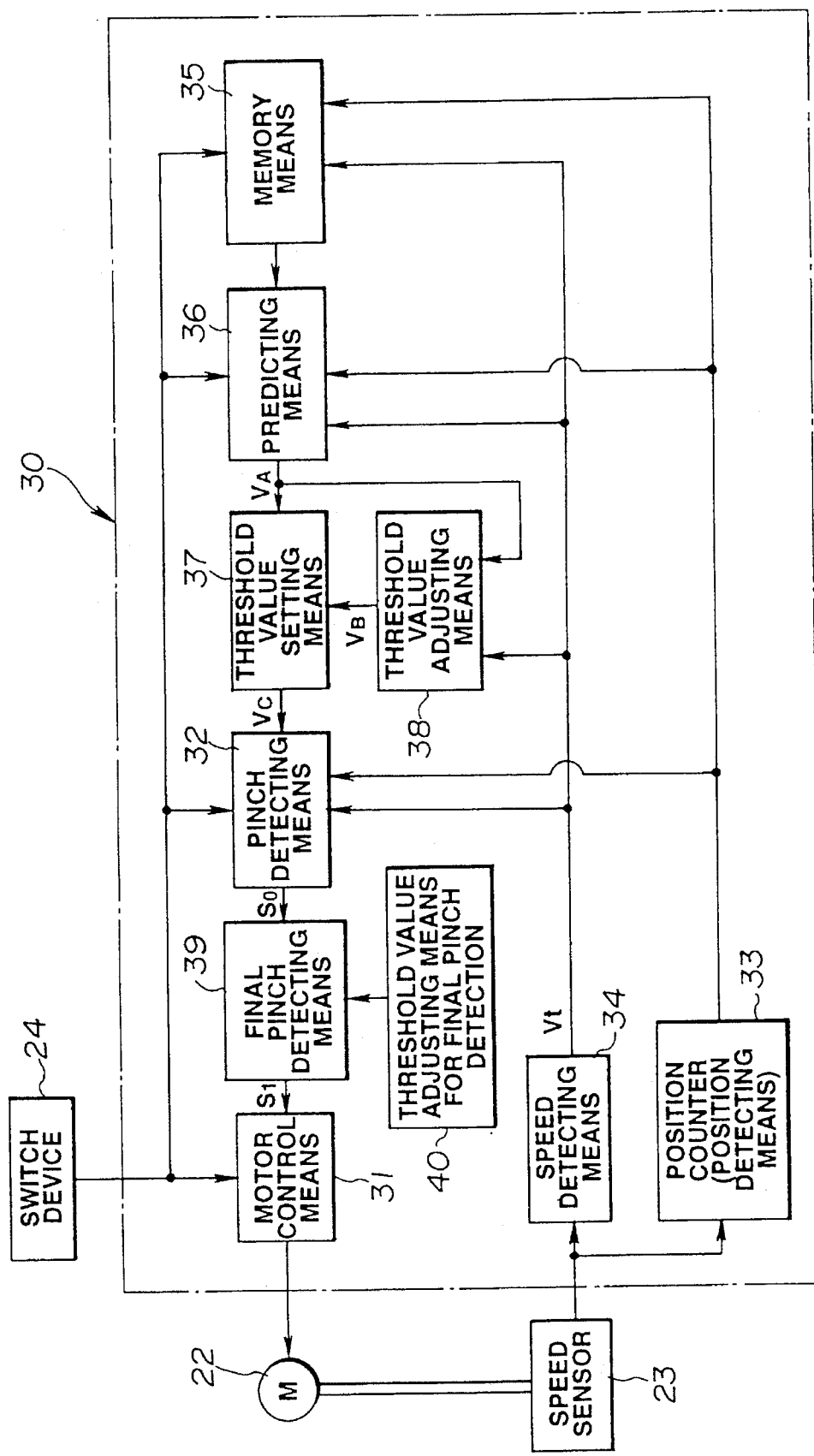
FIG. 6 shows a block diagram of a control device employed in a second embodiment of the present invention.
Figure 7:
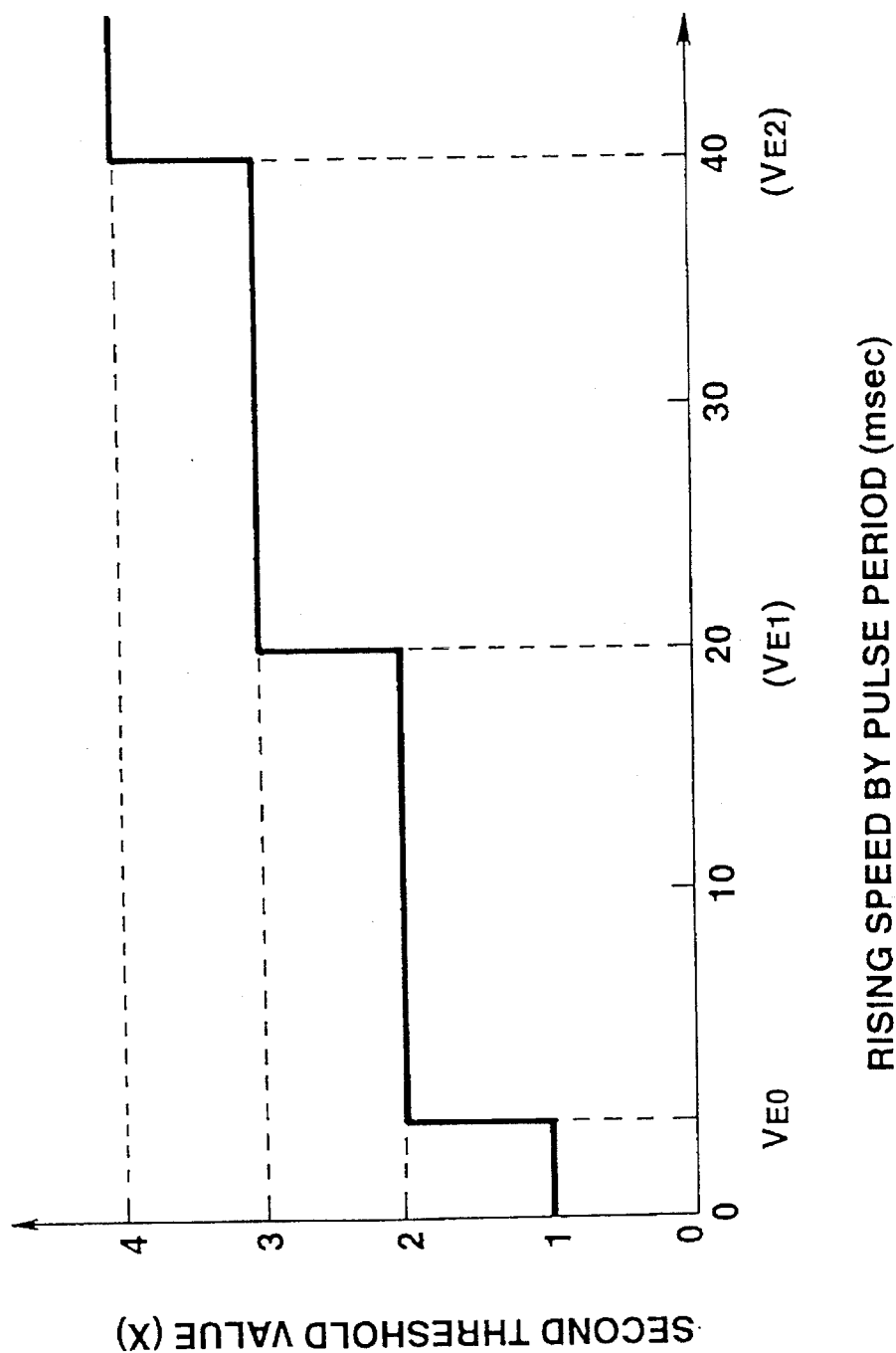
FIG. 7 is a graph for explaining a threshold level adjusting operation carried out by the control device of FIG. 6.

FIGS. 6 and 7 are drawings showing a second embodiment of the present invention. Components corresponding to those of the above-mentioned first embodiment are:denoted by the same reference numerals and detailed description of such will be omitted for brevity.

As will be noted from a comparison of FIGS. 2 and 6, this embodiment includes elements in addition to those of the above-described first embodiment. A final pinch detecting means 39 and a threshold level adjusting means (hereinbelow: 'second adjusting means') 40 are provided for final pinch detection. The final detecting means 39 counts the pulses of the pinch detecting signal (viz., "abnormal detecting signal" in this embodiment) from the detecting means 32. When the counted value exceeds a predetermined threshold level (hereinbelow: "second threshold level") X, the final pinch detecting means 39 outputs a final pinch detecting signal S1. When the detecting signal S1 is output, the motor control means 31 turns the UP-relay OFF to stop rising movement (UP-operation) of the window 2. The second threshold level is an integer and its minimum value is 1 (one).

The second threshold level is adjusted by the second adjusting means 40, in the following manner. As is shown in FIG. 7, the second adjusting means 40 adjusts the second threshold level in accordance with the rising speed of the window 2. The value of the rising speed Vt on the axis of abscissas is represented in terms of the period of pulse signal (pulse period) outputted from the speed sensor 33. As the value increases, the rising speed Vt becomes lowered. When the closing speed Vt of the window 2 is greater than a reference speed VE0, the second threshold level X is kept at "1", which is the minimum value, while when the closing speed Vt is within a range from VE1 to VE0 (that is, VE0>Vt≧VE1), the threshold level X is kept "2", and when the closing speed Vt is within a range from VE2 to VE1 (that is, VE1>Vt ≧VE2), the threshold level X is kept "3" Like this, the threshold level X is increased by one in accordance with the degree by which the closing speed Vt is lowered.

Accordingly, when the closing speed Vt is lowered, thus lowering the pinch force generated when a strong pinch takes place, the threshold level X is increased in order to assure accurate pinch detection.

Figure 8:
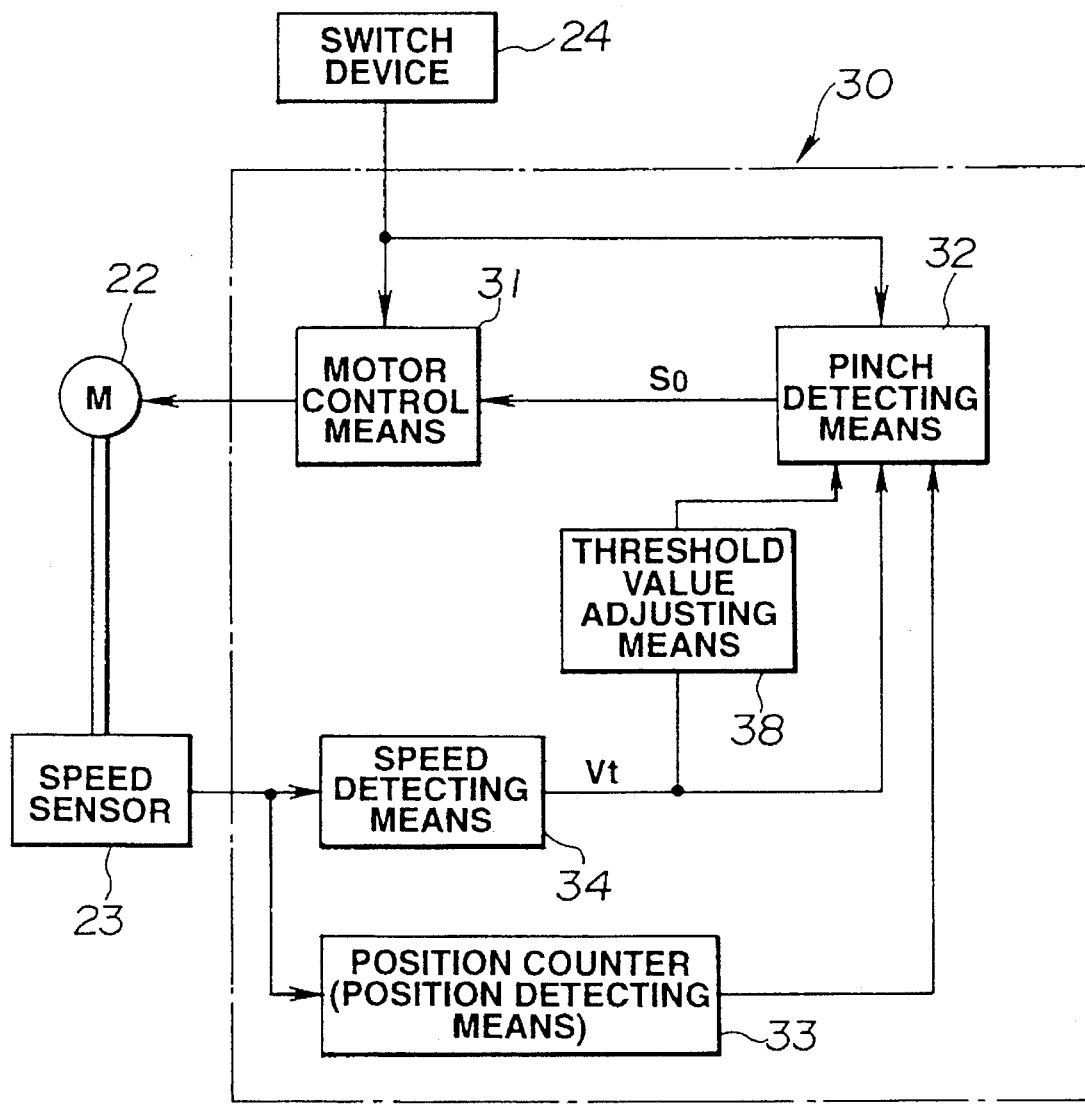
FIG. 8 shows a block diagram of a control device employed in a third embodiment of the present invention.

FIG. 8 is a block diagram explaining a third embodiment of the present invention.

According to the present embodiment, the pinch detecting means 32 compares the closing speed Vt of the window 2 with the threshold level of the closing speed which is provided for each closing position of the window. That is, when the closing speed Vt becomes smaller than the threshold level, the pinch detecting means issues a pinch detecting signal S0. The threshold level is adjusted by the threshold adjusting means 38 in accordance with the closing speed Vt similarly to the operation of the above-described first embodiment, when the closing speed Vt is great, that is, in case wherein there is risk of occurrence of substantially strong pinching, the threshold level is increased. While, when the closing speed is small, the threshold level is lowered, thereby lowering the pinch detection sensitivity.

Figure 9:
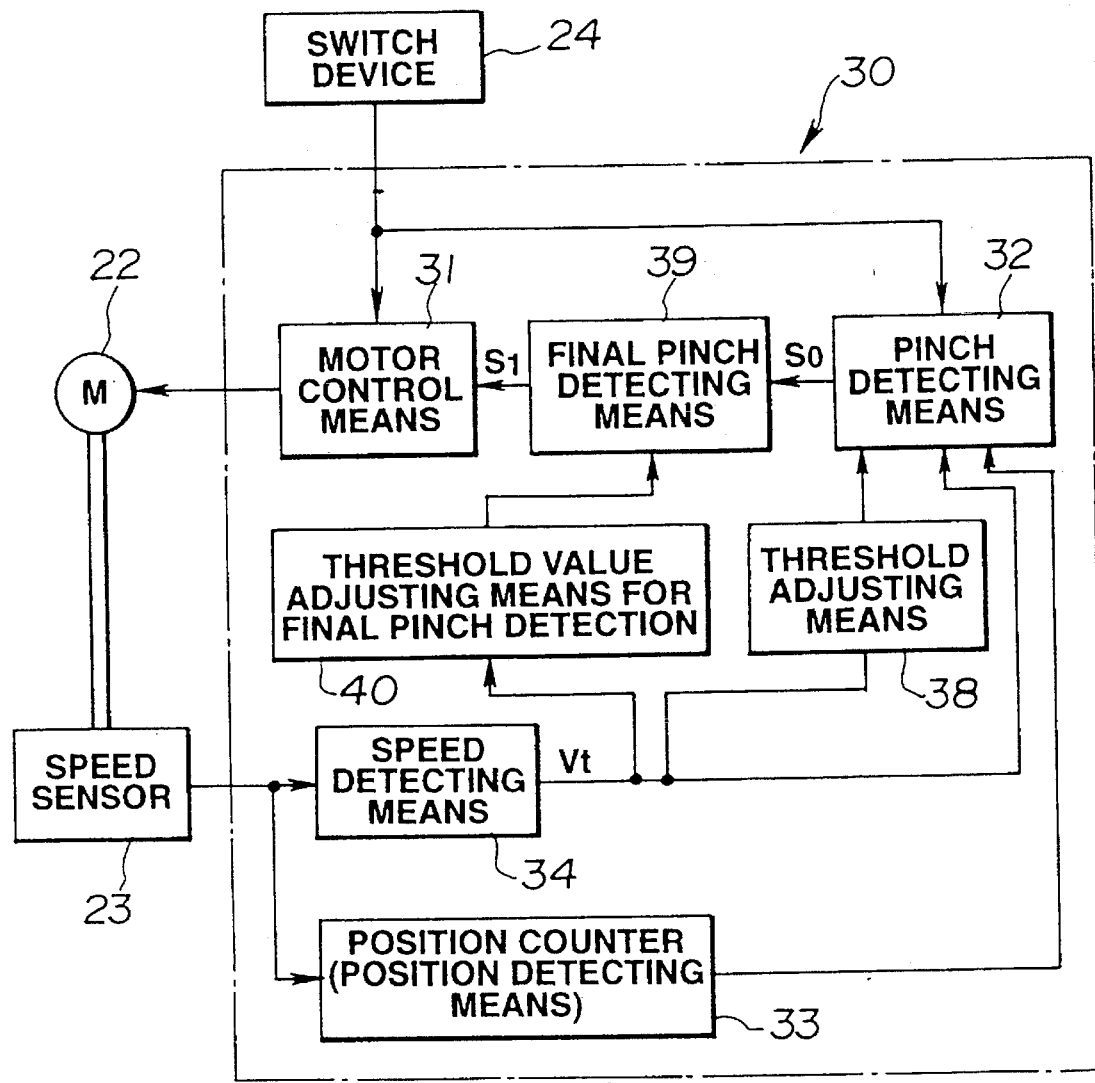
FIG. 9 shows a block diagram of a control device employed in a fourth embodiment of the present invention.

FIG. 9 is a block diagram presented for explaining a fourth embodiment of the present invention.

This embodiment comprises elements of the above-described third embodiment (see FIG. 8), and the final pinch detecting means 39 of the above-mentioned second embodiment and the final pinch detection threshold level adjusting means 40 of the second embodiment. Accordingly, similar to the case of the above-mentioned second embodiment, the second threshold level X is adjusted in accordance with the closing speed Vt.

It will be noted that the closing resistance representing value for pinch detection is not limited only to the closing speed. For example, the driving current of the electric motor 22 may be used. That is, any value may be used so long as it varies in accordance with the closing resistance of the window.

As is described hereinabove, in a drive control device for an opening and closing member according to the first embodiment of the present invention, the threshold level for pinch detection is adjusted in accordance with the closing speed of the opening and closing member. Thus, the pinch detection sensitivity is maintained such that reliable pinch detection can always be assured.

In the drive control device of an opening and closing member according to the second embodiment of the present invention, in case wherein the pulses of the pinch detection signal are counted and pinching is recognized when the count value exceeds a threshold level, the threshold level being adjusted in accordance with the closing speed of the opening and closing member. Thus, the pinch detection sensitivity is controlled to a degree optimum to the degree of pinch which is likely to occur, so that appropriate pinch detection can be made assuredly.

In the drive control device of an opening and closing member according to the third embodiment of the present invention, a closing resistance representing value at the time when the opening and closing member is being closed is predicted and, by using the predicted value, a threshold level for a pinch detection is set. By adjusting the threshold level in accordance with the closing speed of the opening and closing member, pinch detection sensitivity is controlled to a degree optimum to the degree of pinch which may be expected to occur, thus reliable, proportional pinch detection may be obtained.

In the drive control device of an opening and closing member according to the fourth embodiment of the invention, by predicting a closing resistance representing value at the time when the opening and closing member is being closed, pinching may be detected. The pulses of the pinch detection signal are counted. When the counted number exceeds a threshold level, it is determined the at pinching has occurred. Upon this determination the threshold level is adjusted in accordance with the closing speed of the opening and closing member and the pinch detection sensitivity is controlled to a degree optimum to the degree of pinching. Thus this embodiment offers the same advantages as the previous embodiments.

It will be noted that, although the preferred embodiments of the invention have been set forth in terms of an automotive power window system, the present invention may also be utilized in various other mechanisms in which highly safe operation is desired for control of opening/closing members. Specifically, such control may be applied to valves, shutters, automatic door systems, access hatches and various other manually controlled opening/closing members for which operational safety must be assured in a case where an obstruction is encountered in the path of closing motion of the opening/closing member.

In addition, the above pinch prevention system is not limited to detection of pinching in the opening direction only, that is, pinch detection while an opening/closing member is moving in the opening direction may be effected. Such utilization is useful, for example, if a foreign object becomes wedged between an opening/closing member and a mounting frame thereof (i.e. vehicle window and door frame) while the opening/closing member moves in the opening direction. Indeed, the pinch prevention operation according to the invention may even be implemented in both opening and closing directions for providing highly safe operation of an opening and closing members such as a vehicular power window.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A drive control device for controlling a driving mechanism active to move an opening and closing member in first and second directions, comprising:

resistance detecting means which outputs a closing resistance value which varies in accordance with a detected resistance acting against movement of said opening and closing member during moving operation thereof;

pinch detecting means, active to terminate moving operation of said opening and closing member when said closing resistance value detected by said resistance detecting means exceeds a predetermined threshold level; and threshold control means which varies said threshold level in accordance with a moving speed of said opening and closing member.

2. A drive control device for an opening and closing member as set forth in claim 1, further including position detecting means, said threshold control varying said threshold level in accordance with a moving speed and position of said opening and closing member.

3. A drive control device for an opening and closing member as set forth in claim 2, further including monitoring means which detects whether or not said opening and closing member is positioned within a predetermined monitoring zone so as to activate said pinch detecting means, said pinch detecting means operable only when said opening and closing member is positioned within said pinch monitoring zone.

4. A drive control device for an opening and closing member as set forth in claim 3, wherein said predetermined monitoring zone includes a position proximate terminal positions of movement of said opening and closing member in said first and second directions.

5. A drive control device for an opening and closing member as set forth in claim 1, wherein said drive control device is active only when said opening and closing member is driven said first direction which is established to be a closing direction thereof.

6. A drive control device for an opening and closing member as set forth in claim 1, wherein said drive control device is active only when said opening and closing member is driven in said second direction which is established to be an opening direction thereof.

7. A drive control device for an opening and closing member as set forth in claim 1, wherein said pinch detecting means further comprises:

first pinch detecting means active to repeatedly issue an abnormal condition signal when a closing resistance detected by said resistance detecting means exceeds a predetermined first threshold level; and second pinch detecting means active to stop movement of said opening and closing member when a number of successive outputs of said abnormal condition detecting signal exceeds a second threshold level;

and wherein said threshold level adjusting means is active to vary said second threshold level in accordance with said moving speed of said opening and closing member.

8. A drive control device for an opening and closing member as set forth in claim 1, further including: p1 memory means which memorizes respective resistance representing values output at a plurality of positions along the path of motion of said opening and closing member;

predicting means which predicts a future change of the resistance representing value based on current position, direction of movement and a currently detected resistance representing value of said opening and closing member and said resistance representing values memorized in said memory means and outputting a predicted resistance representing value signal;

threshold setting means which sets a threshold level for carrying out pinch detection by adding an allowed additional value to the predicted resistance representing value output by said predicting means,;

pinch detecting means which stops said movement of said opening and closing member when the resistance representing value detected by said resistance detecting means exceeds said threshold level; and threshold level control means which controls said allowed additional value in accordance with said moving speed of said opening and closing member.

9. A drive control device for an opening and closing member as set forth in claim 1, further including:

memory means which memorizes said resistance representing value output by said resistance detecting means;

predicting means which outputs a predicted resistance representing value based on a currently detected resistance representing value and said resistance representing value memorized in said memory means;

threshold level setting means which sets a first threshold level for carrying out pinch detection operation based on said predicted resistance representing value;

first pinch detecting means which repeatedly issues an abnormal condition detecting signal when a resistance representing value detected by said resistance detecting means exceeds said first threshold level;

second pinch detecting means active to stop movement of said opening and closing member when a number of successive outputs of said abnormal condition detecting signal exceeds a second threshold level; and threshold level control means which varies said second threshold level in accordance with said moving speed of said opening and closing member.

10. A drive control device for an opening and closing member as set forth in claim 1, wherein said resistance representing value is determined on the basis of one of:

a detected moving speed of said opening and closing member; and a detected drive current of an electric motor by which movement of the opening and closing member is effected.

* * * * *